United States Patent [19]
Moench et al.

[11] Patent Number: 4,654,243
[45] Date of Patent: Mar. 31, 1987

[54] DEVICE FOR GUIDING DAYLIGHT

[75] Inventors: Julius Moench, Wendelstein; Heinz Rentzsch, Coburg; Georg Lang, Stockheim; Herbert Mueller, Kronach, all of Fed. Rep. of Germany

[73] Assignee: Siemens Aktiengesellschaft, Berlin and Munich, Fed. Rep. of Germany

[21] Appl. No.: 802,529

[22] Filed: Nov. 27, 1985

[30] Foreign Application Priority Data

Nov. 30, 1984 [DE] Fed. Rep. of Germany ....... 3443782
May 7, 1985 [DE] Fed. Rep. of Germany ... 8513450[U]

[51] Int. Cl.[4] .............................................. B32B 3/14
[52] U.S. Cl. ....................................... 428/46; 428/48; 350/262; 350/265; 350/286

[58] Field of Search .................... 428/46, 48; 350/286, 350/259, 265, 262

*Primary Examiner*—Alexander S. Thomas
*Attorney, Agent, or Firm*—Hill, Van Santen, Steadman & Simpson

[57] ABSTRACT

Since only relatively small-area prism sub-plates can be manufactured in warp-free fashion, large area prism plates are formed of a plurality of sub-plates. A connection of the sub-plates must be stable and the expense for joining the sub-plates should be as low as possible. To create the large-area prism plate, adjoining sub-plates are connected to one another in two dimensions by at least one positive lock plug-type connection comprising locking projections and locking projection receptacles which form plug-type connections secured by latching devices which do not allow a dislocation of the joined sub-plates in a third dimension.

18 Claims, 8 Drawing Figures

DEVICE FOR GUIDING DAYLIGHT

BACKGROUND OF THE INVENTION

The invention relates to a device for guiding daylight comprising a prism plate of synthetic glass which has a base side and an active side. The active side has embankments which form trenches thereat.

Since large-area (for example 40×40 cm) and relatively thick (for example 5 mm) prismatic panes of synthetic glass (for example of polymethylmethacrylate-PMMA) have not yet been successfully manufactured in planar and warp-free fashion with adequate precision, such prism plates had to be composed of small sub-plates. For this purpose, the sub-plates were flued to one another at their narrow edge sides at their end faces. This, however, results in high manufacturing expense. Furthermore, the glue causes disturbing deposits and deteriorates the mechanical stability over the long term (crack formation) when such prism plates are situated in a closed interior between panes of glass.

SUMMARY OF THE INVENTION

It is an object of the invention to design the sub-plates and/or additional joining means such that the sub-plates can be combined to form a large-area prism plate in a simple way without employing an adhesive.

According to the invention, sub-plates are connected to one another so as to form a large-area prism plate. At least one positive lock plug-type connection connects the two plates to one another. The connection comprises a locking projection and a mating locking projection receptacle. The plug-type connection includes a latching means for securing the plug-type connection in a dimension perpendicular to a plane of the prism plate. According thereto, simple positively locking plug-type connections with dovetailing locking projections or tenons and projection receptacles or mortises mating thereto first insure an adhesion of the sub-plates in two dimensions, preferably within the plate plane. The plug-type connections are prevented from falling apart in the direction of the third dimension—at right angles to the plate plane—by latching devices.

The projections or tenons are preferably dove-tailed in shape and fashioned as one piece with a sub-plate. Within the framework of the invention, however, every locking projection can also be a separate part and can plug into adjoining projection receptacles of the sub-plates to be joined. In this case, the projection is fashioned symmetrically relative to a center plane, and are particularly fashioned in a dove-tailed manner at both sides of the center plane. The sub-plates then only have the identically shaped projection receptacles. These can be situated parallel or at right angles to the plate plane.

Every latching device is fundamentally composed of a latch shoulder at one sub-plate and of a latch stop face at the neighboring sub-plate such that the latching stop face overlaps the latching shoulder of the other sub-plate when the sub-plates are joined.

In the simplest case, the latching stop face of every latching means can be situated at the end of a spring arm. The spring arm can be situated in the region of an edge side of a sub-plate such that, thanks to an oblique guiding surface, the spring arm is first pushed back into a recess when the sub-plates are joined. In the final position of the hooked together sub-plates, the latching stop face springs into a recess of the other sub-plate and overlaps the latching shoulder of the other sub-plate.

The spring arm can be situated at the edge side with the projection or at the edge side with the projection receptacles. In the former case, the free end of the spring arm with the latching stop face faces the active side. In the latter case, it faces the base side of the sub-plates. The spring arm and latching stop face can also be situated at a projection or at the walls of a projection receptacle. The spring arm, latching stop face, and sub-plate preferably form a single-piece part in every case.

In a preferred embodiment of the invention, the latching stop face of every latching device is situated at the upper part of a retainer which is inserted into a recess in the active side of the joined sub-plates. Thus, this recess is bounded by sub-recesses and by the latching shoulders at the joined sub-plates. The upper part of the retainer can have a planar surface at the outside or can continue the profile of the active side in the region of the recess. A retaining member of the retainer extends through a latching opening surrounded by the latching shoulders and is held in the latching opening by a latch hook at the end of the retaining member.

The retaining member and upper part of the retainer can be two separate parts which are plugged through the latching opening from both sides of the joined sub-plates and are connected to one another in a positively locking fashion.

It is more advantageous to provide the upper part and the retaining member as a one-piece assembly and to employ two resilient holding arms as a retaining member. These comprise a latch hook at the end.

The recess for the upper part of the retainer is situated in the region of the edge side of the joined sub-plates and is bounded by sub-recesses of identical size in the adjoining sub-plates. When a retainer is situated in the region of an edge side between the corners of the sub-plates, then the recess for the retainer is formed by two sub-recesses, half of each of these lying in each of the sub-plates abutting at this location.

Insofar as four sub-plates abut in one corner, it is particularly advantageous to situate the retainer in this corner. In this case thus the recess for the retainer is formed by four sub-recesses, whereby each sub-recess forms one-fourth of the contour of the recess for the upper part of the retainer.

As a rule, a prism plate composed of sub-plates is situated in floating fashion between the glass panes of a composite pane. A plurality of prism plates can also be situated above one another in the interior between the glass panes. In this case, the prism plates are preferably supported with their retainers since these retainers lie on one another with supporting faces. A defined spacing between the prism plates can thus be achieved since one of the two retainers lying on top of one another has a spacer formed of the supporting surface. The supporting surfaces of the two retainers lying on top of one another can proceed parallel to the base surface of one of the prism plates, or can continue the profile of the active sides in the region of the recess.

Over and above this, a retainer at the side lying opposite the active side can also have a spacer which projects beyond the base side of the prism plate. A defined spacing, for example from a neighboring glass pane, can thus also be achieved at this side.

In view of the great, temperature-dependent changes (up to 8 mm) in the distance between the glass panes of a composite pane, it has proven particularly expedient to equip the retainers with a receptacle for a resiliently seated spacer pin.

The mutually parallel wall or trenches at the active side of every sub-plate which are limited by oblique surfaces can proceed at an arbitrary angle relative to an edge side. When, on the other hand, one wishes to use identical sub-plates (only one injection molding die), then the number and arrangement of locking projections and projection receptacles must be based on this angle. Particularly simple relationships result with a quadratic sub-plate having a side length of 20 to 40 cm and n walls or trenches proceeding parallel to an edge side, and where n is a whole number. At least two respective projections are provided at each of two neighboring edge sides, and a corresponding number of projection receptacles are provided at the two other edge sides. A sub-recess is provided at every corner.

DESCRIPTION OF THE PREFERRED EMBODIMENTS

Figure 1:
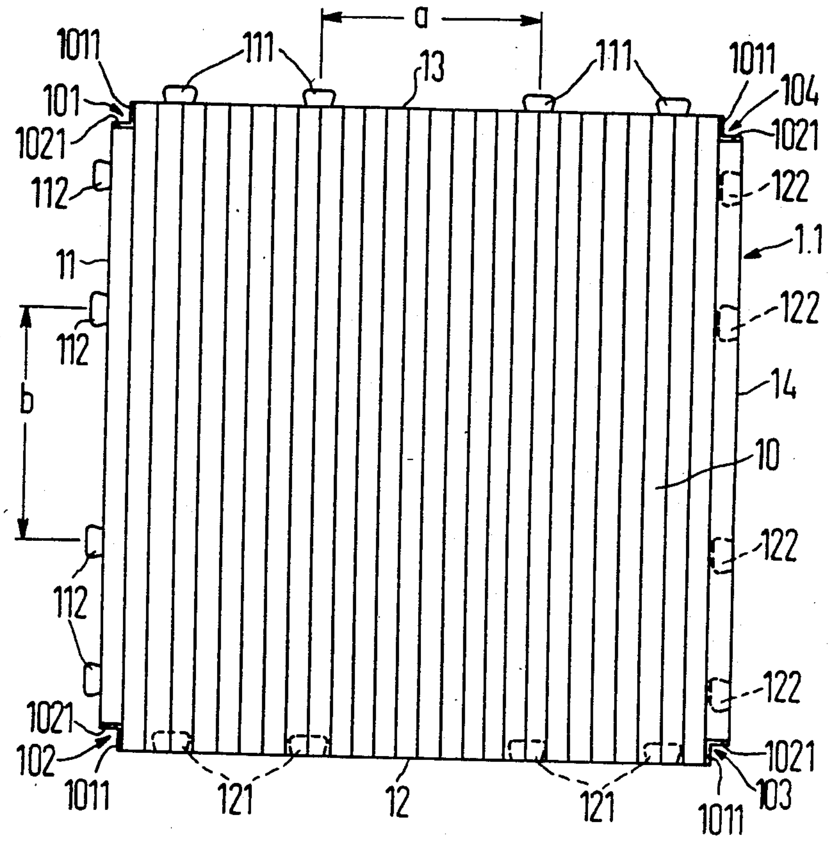
FIG. 1 is a plan view of a sub-plate.

The quadratic sub-plate 1.1 is shown in plan view in FIG. 1, so that its active side 10 can be seen. Embankments and trenches (peaks and valleys) are alternatingly situated thereon next to one another. The embankments are defined by two oblique surfaces which describe an acute angle. The embankments thus have the form of prismatic rods and proceed parallel to one another and to two edge sides 11, 14. Between these edge sides, n embankments or trenches having a respectively identical contour are situated, where n is a whole number. The angle between the oblique surfaces is preferably 90° and the respective oblique surfaces of every embankment facing the same edge side are mirrored with vapor-deposited aluminum. With such a prism plate, sunlight below a critical angle can be kept out of a room and bright zenith light above this critical angle can be guided into the room.

Four locking projections 112 or 111 having a dovetail profile are situated at the one edge side 11 and at a neighboring edge side 13 of the sub-plate which proceeds at a right angle relative to side edge 11. They are at a respective distance from the corners of the sub-plate, are flush with the base side 15 thereof at the bottom, and do not extend up to the active side 10 (see FIG. 2, for example).

Figure 2:
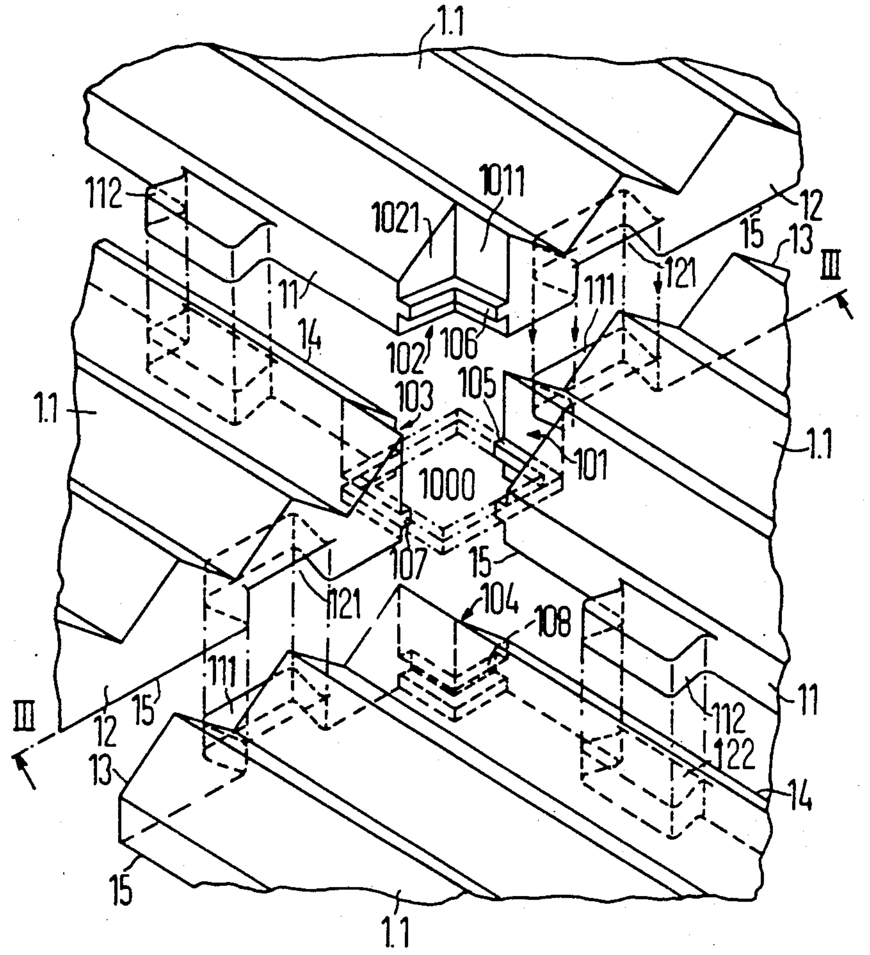
FIG. 2 illustrates by a perspective view the corner region of four such sub-plates before being joined.

At the two other edge sides 12 and 14, the sub-plate has four respective projection receptacles 121 or 122 open toward the edge side and toward the base side 15. They are of such a shape and arrangement that a plurality of identical sub-plates of FIG. 1 can be joined in gap-free fashion and flush to form a large-area prism plate, as shown in FIG. 2. The distance a or b between two projections 111 or 112 as well as the corresponding distance between the respectively corresponding projection receptacles is somewhat different at the edge sides 13 and 11. Incorrect joining of the sub-plates is thus impossible.

Figure 4:
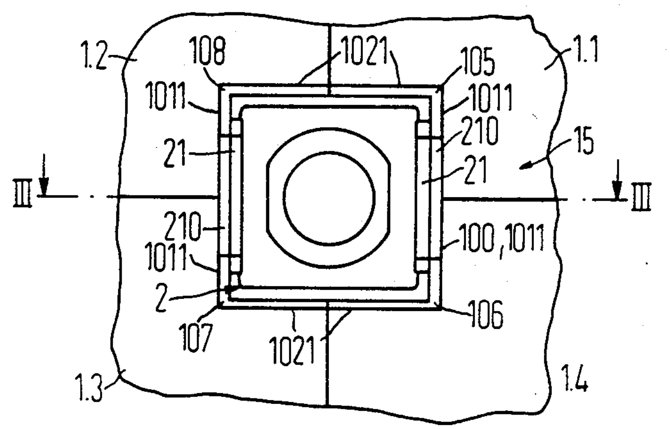
FIG. 4 is a view in the direction of the arrow IV in FIG. 3.

At every corner, the sub-plate 1.1 of FIG. 1 has a sub-recess 101, 102, 103, 104 which extends from the active side 10 to a latching shoulder 105, 106, 107, 108, and is respectively limited by two boundary surfaces 1011, 1021 of identical length which proceed parallel or perpendicular to the edge sides 11 through 14. When, as shown in FIGS. 2 and 4, four sub-plates 1.1 are joined to form a prism plate, the sub-recesses 101 through 104 of the four meeting corners of the four sub-plates form a quadratic recess 100 (shown in FIG. 4) which extends from the active side 10 of the prism plate to the latching shoulders 105, 106, 107, and 108. These shoulders have a rectangular cross-section, proceed parallel to the boundary surfaces 1011, 1021 and to the base side 15, and are set back relative to this base side 15. Together, they surround a latching opening 1000.

Figure 3:
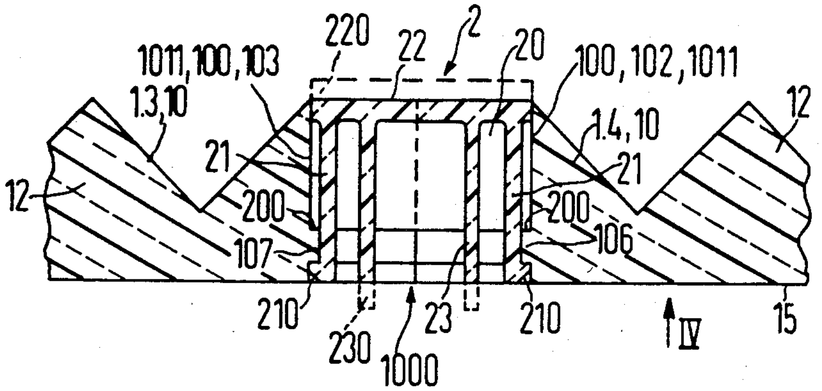
FIG. 3 is a magnified sub-view along line III—III in FIGS. 2 and 4 given joined sub-plates.

As shown in FIGS. 3 and 4, a retainer 2 which is quadratic in plan view is inserted into the recess 100 formed by the four sub-plates. The upper part 20 of this retainer 2 fits precisely into this recess 100 and has a planar supporting surface 22 which is flush with the active side 10 or lies somewhat above it (broken lines in FIG. 3). The retainer 2 has a retaining member formed of two resilient holding arms 21 which extend through the latching opening 1000 and overlap the latching shoulders 105, 106 or 107, 108 with latch hooks 210. The latch hooks 210 do not project into the plane of the base side 15. The latching detents 200 of the retainer 2 are thus pressed against the latching shoulders 105 through 108 of the sub-plates 1.1. Thus, the sub-plates joined in accordance with FIGS. 2 and 4 can no longer release since a dislocation of the sub-plates at right angles to their base side 15 would be required for this purpose. However, such a motion is prevented by the retainer 2. As a consequence of the distribution of the projections and projection receptacles at a sub-plate of FIG. 1, two relatively narrow holding arms 21 of FIG. 4 lying opposite one another suffice for this purpose. These holding arms 21 are parallel to one another and to an edge side, preferably to the embankments of the active side 10.

Figure 7:
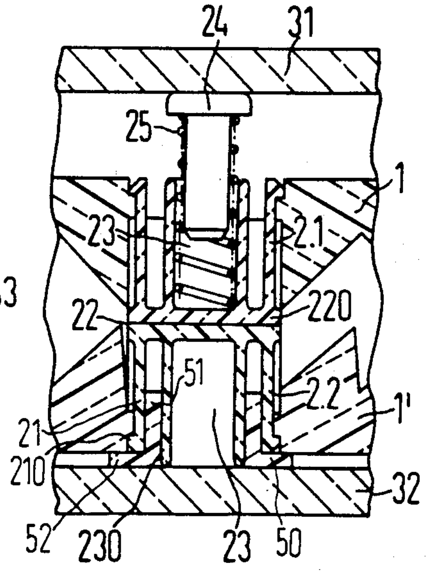
FIG. 7 is a section through a region in FIG. 5 comprising two retainers, likewise shown in magnified scale.

At the inside between its holding arms 21, the retainer 2 has a socket 23—preferably having a cylindrical bore—into which a spacer pin 24 and a spring 25 pressing the spacer pin out of the socket are insertable, as shown in FIG. 7.

The spacing of a prism plate to neighboring parts can be defined at the same time with the assistance of the retainer 2. For this purpose, the retainer can comprise at its upper surface a spacer member 220—shown with broken lines in FIG. 3—which projects beyond the active side and/or can comprise a spacer member 230 shown with broken lines at its underside. The spacer member 230 is formed by the walls of the socket 23 which project beyond the base side 15.

Figure 5:
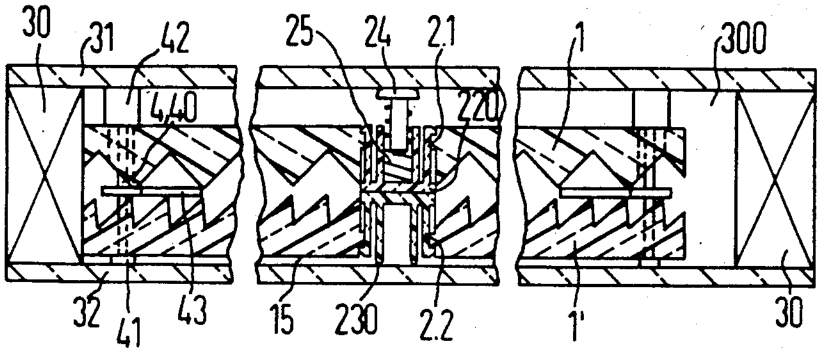
FIG. 5 is a sectional view through a composite pane comprising two prism plates.

FIG. 5 shows a composite pane comprising two glass panes 31, 32 joined to one another by edge members 30 which thus surround a sealed interior 300. Two prism plates 1, 1′ formed of a plurality of joined sub-plates are situated in floating fashion in this interior, namely such that their differently fashioned active sides are directed toward one another. The sub-plates of every prism plate are joined with a positive lock and are latched by retainers, as was set forth with reference to FIGS. 1 through 4. Employed in conjunction with the prism plate 1 is a retainer 2.1 having a spacer member 220 at its upper side. This spacer member 220 comprises a supporting surface 22 which projects beyond the active side of this prism plate and is seated against the supporting surface of a retainer 2.2 of the other prism plate 1'. The supporting surface 22 of the retainer 2.2 of the lower prism plate 1' terminates flush with the active side. In this fashion, the spacing between the prism plates 1, 1' is defined by the retainers 2.1, 2.2.

The retainer 2.2 has a spacer member 230 by means of which the spacing of the base side 15 of the prism plate 1' from the glass pane 32 is defined.

The prism plates 1 and 1' are guided in their edge region by spacers 4. Such a spacer has a shaft 40 comprising a spacer head 41 and is plugged into an edge bore 16' in the prism plate 1' which mates with the shaft. A three-armed spacer disk 43 is slipped onto the shaft 40. This spacer disk 43 lies against the edges of the active side of the lower prism pane 1', and the active side of the upper prism pane 1 is supported thereagainst at the other side. The spacing of the prism plates in the edge region is assured in this way.

The edge bore 16 for the shaft 40 in the upper prism plate 1 is selected larger than the diamter of the shaft 40, so that the two prism plates (which are thermally conditioned) can move relative to one another.

Figure 6:
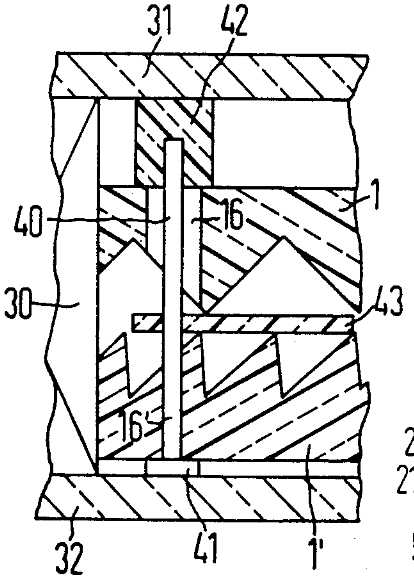
FIG. 6 is a section through the edge region in FIG. 5 comprising a spacer, shown in magnified form.

The two prism plates are seated in a practically play-free manner between the glass panes 31, 32 in the edge region of the composite pane. A spacer cap 42 of appropriate height is placed on the end of the shaft 40 (FIG. 6). The spacing between the glass panes 31, 32 depends on temperature and air pressure. This dependency increases toward the center of the composite pane. Therefore, a spring 25 and a spacer pin 24 are inserted into the socket 23 of the retainer 2.1 in the upper prism plate 1. The two prism plates are thus pressed against the lower glass pane 32 which always faces the interior. An equidistant arrangement of the prism plates 1, 1' relative to one another and relative to the glass pane 32 is assured in this way. Accordingly, it is assumed that the height of the spacer head 41 of the edge connector 4 is identical to the height of the spacer member 230 of the retainer 2.2, and the thickness of the spacer diks 43 is idetical to the height of the spacer member 220 of the retainer 2.1.

The prism plates 1, 1.1 have a significantly greater coefficient of thermal expansion than the glass panes. They therefore have an adequate spacing from the edge members 30 and can therefore freely move in the interior. They are seated there in floating fashion.

In accordance with FIG. 7, an interlock member 50 comprising a flange 52 and a journal 51 is plugged from below onto the retainer 2.2. With the journal 51, the holding arms 21 with the latch hooks 210 are secured in the illustrated position. The flange 52 thus also acts as a spacer member (for example instead of 230).

In accordance with a further development of the invention, each prism plate is arranged between two guide legs which are connected to the inside of the insulating glass web such that the guide legs proceed parallel to the glass panes and form a second embodiment of a spacer. Two respective guide legs thus form a channel whose spacing is selected in accordance with the thickness of a prism plate and in which this prism plate can move freely.

The guide legs are preferably of translucent, particularly transparent material, so that they are not very disturbing in the edge region of the composite window.

It lies within the framework of the invention to combine the two guide legs allocated to a prism plate with an assembly leg proceeding at right angles relative to the two guide legs to form a profile member which is connected to the insulating glass web with the assistance of the assembly leg.

Insofar as a plurality of prism plates are to be arranged above one another between the glass panes, it is preferable to form the spacers of a plurality of profile members comprising guide legs and assembly legs. It is then easier to observe very small manufacturing tolerances for the spacings between the guide legs.

Figure 8:
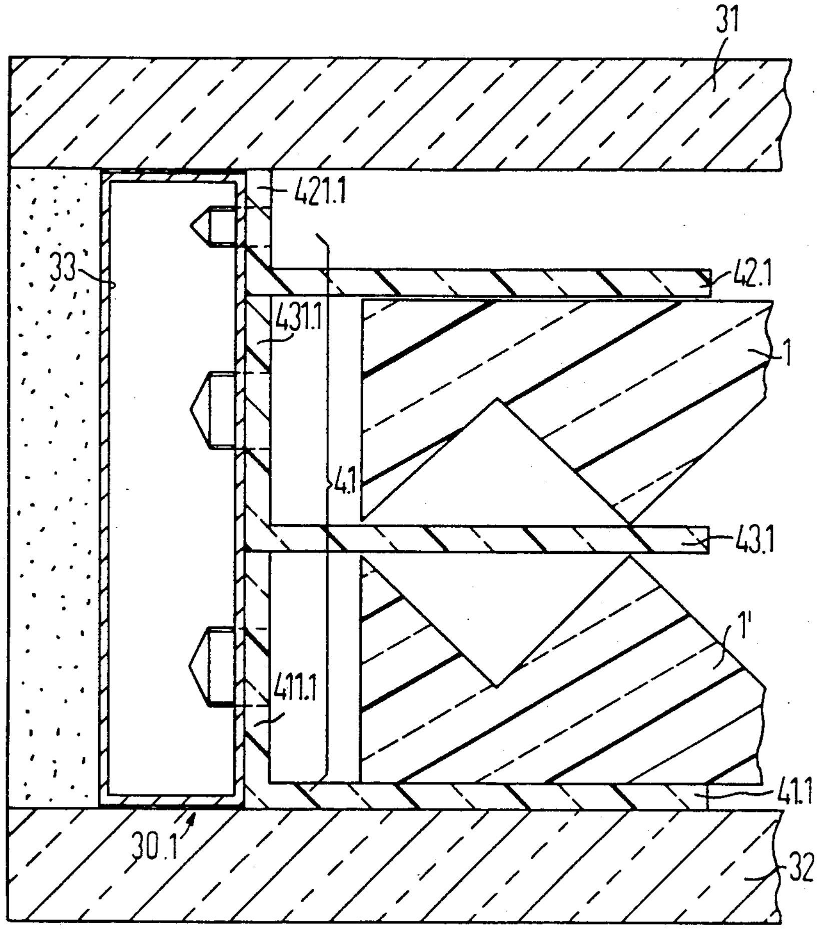
FIG. 8 is a section like FIG. 6 comprising a different spacer.

An exemplary embodiment of this type is shown in FIG. 8 in which the edge region of a composite window is shown in cross-section. The two glass panes 31 and 32 are thus joined by a known insulating glass web 33 whose interior is filled with a molecular sieve. The outside of the insulating glass web 33 is filled between the projecting glass panes 31 and 32 by an adhesive. The spacer 41 is secured to the inside of the insulating glass web 33, this spacer being formed here of three profile members. Each profile member is composed of a guide leg 41.1, 42.1, 43.1 and of an assembly leg 411.1, 421.1, 431.1. These profile members with an angle profile are connected to the inside of the insulating glass web 33 by rivets or screws such that the assembly legs abut one another in a gap-free manner. The length of these assembly legs thus defines the spacing between neighboring guide legs and thus the width of the channel into which the prism plates 1, 1' are plugged.

Although various minor changes and modifications might be proposed by those skilled in the art, it will be understood that we wish to include within the claims of the patent warranted hereon all such changes and modifications as reasonably come within our contribution to the art.

We claim as our invention:

1. A device for guiding daylight, comprising:

a prism plate of synthetic glass which has a base side and an active side, the active side having embankments forming trenches thereat;

the prism plate being formed of at least two sub-plates adjacent each other and which join with one another in gap-free fashion at least at one edge side of the sub-plates;

connecting means connecting the sub-plates, the connecting means comprising at least one positive lock plug connection including a locking projection and a mating locking projection receptacle; and latching means for securing the plug connection in a direction perpendicular to a planar surface of the prism plate created by the combination of the at least two sub-plates.

2. A device according to claim 1 wherein every locking projection has a dove-tail shape, projects out of at least one of the edge sides of the sub-plate, and forms a one-piece formed member together with the sub-plate; said locking projection receptacle being open both toward said base side and a respective edge side thereat; and each latching means comprising a latching shoulder at one sub-plate and a latching stop face of the other sub-plate, which overlaps the latching shoulder when the sub-plates are in a locking position.

3. A device according to claim 2 wherein the stop face of every latching means is situated in the region of an edge side of a sub-plate of an end of a spring arm; and the spring arm, latching stop face and sub-plate are formed as a one-piece unit.

4. A device according to claim 2 wherein the latching stop face of every latching means is situated at an upper part of a retainer; the upper part of the retainer is seated in a recess in said active side of the joined sub-plates; said recess being bounded by sub-recesses and the latching shoulders of the adjacent joined sub-plates; and said retainer having a retaining member with latching hooks extending through a latching opening surrounded by said latching shoulders; and the respective latching hooks overlapping said latching shoulders.

5. A device according to claim 4 wherein the upper part of said retainer and the retaining member are two separate parts connected to one another.

6. A device according to claim 5 wherein said retainer has at least one spacer member projecting beyond one side of said prism plate.

7. A device according to claim 6 wherein said upper part of the retainer continues a profile of said active side of said sub-plates in a region of said recess.

8. A device according to claim 4 wherein two resilient holding arms serve as said retaining member; and said holding arms and said upper part of said retainer are constructed as one piece.

9. A device according to claim 8 wherein said retainer comprises a socket between its holding arms for a spacer pin and for a spring pressing said spacer pin out of said socket.

10. A device according to claim 1 wherein the sub-plates are quadratic, have at least two respective dovetail locking projections with respective different spacing at each of two edge sides perpendicular to one another; two respective projection receptacles mating thereto at the two other edge sides; a sub-recess at every corner, said sub-recess having boundary surfaces of identical length parallel to said edge sides; and wherein n trenches proceed parallel to an edge side, where n is a whole number.

11. A device according to claim 1 wherein said prism plate is arranged in floating fashion in an interior space surrounded by two parallel glass panes and by edge members connecting said glass panes to one another at all sides.

12. A device according to claim 11 wherein at least two equidistant prism plates are provided, said prism plates being guided in their edge region by spacers; each spacer has a shaft plugged through edge bores of said prism plate and has a spacer head at its ends; spacer disks between said prism plates having their active sides directed toward one another, each of said spacer disks being plugged onto said shaft of a spacer; said edge bores in one of two said prism plates being larger than a diameter of said shaft; and said prism plates being held in a substantially play-free manner between said glass panes by said spacers.

13. A device according to claim 1 comprising two glass panes connected to one another at all edge sides by a web; at least one prism plate arranged between said glass panes in floating fashion; a spacer defining a position of every prism plate between said glass panes; said spacer being secured to an inside of said web and having at least two guide legs which extend parallel to said glass panes and guide said prism plate between them.

14. A device according to claim 13 wherein said spacer has an assembly leg which lies against an inside of said web and is connected thereto by a fixed bearing and at least one movable bearing, and from which guide legs project at right angles.

15. A device according to claim 14 wherein said assembly leg and at least two guide legs form a profile member.

16. A device according to claim 14 wherein every guide leg forms a profile member with its own assembly leg; and said profile member being joined to said web such that their assembly legs abut in gap-free fashion against one another.

17. A device according to claim 13 wherein at least said guide legs are formed of a translucent material.

18. A device for guiding daylight, comprising:

a prism plate of synthetic glass which has a base side and an active side, the active side having trenches thereat;

the prism plate being formed of at least two sub-plates adjacent each other and which join with one another in gap-free fashion at least at one edge side of the sub-plates;

connecting means connecting the sub-plates, the connecting means comprising at least one positive lock plug connection including a locking projection and a mating locking projection receptacle; and said plug connection including latching means for securing the plug connection in a direction perpendicular to a planar surface of the prism plate created by the combination of the at least two sub-plates, said latching means including a shoulder at a sub-recess at a corner of the sub-plate and a mating retainer received at the sub-recess.

* * * * *